June 18, 1963   L. AXTHAMMER   3,094,317
HYDRO-PNEUMATIC SPRING ELEMENT
Filed Jan. 22, 1962   2 Sheets-Sheet 1
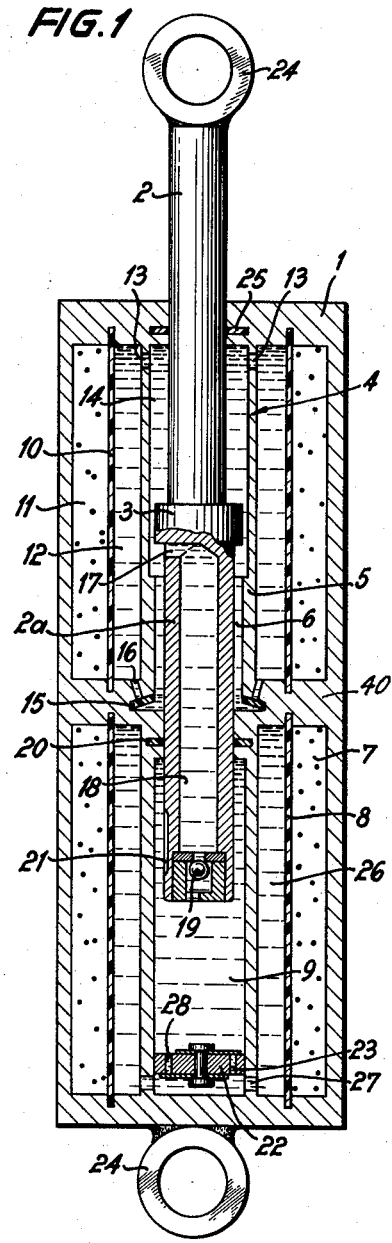
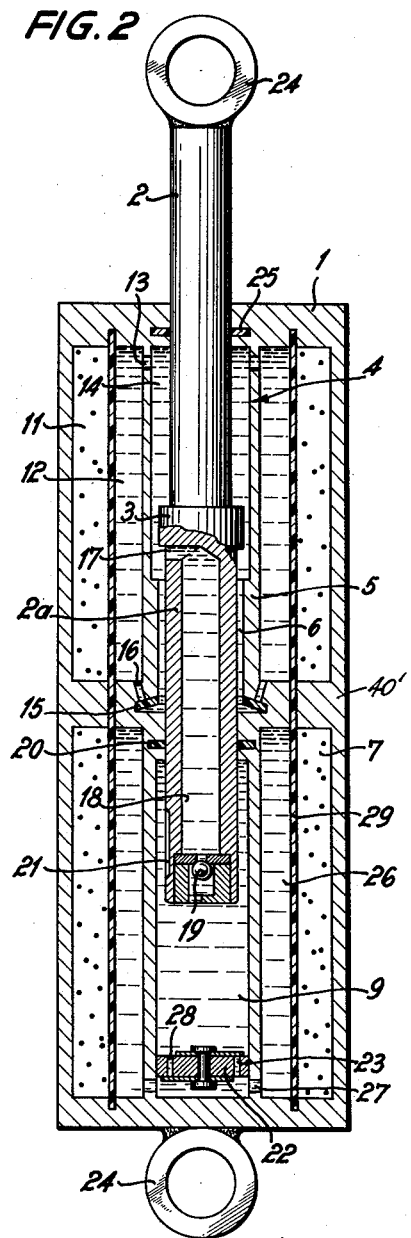
INVENTOR
Ludwig Axthammer
By Richard Ernst
Agt June 18, 1963    L. AXTHAMMER    3,094,317
HYDRO-PNEUMATIC SPRING ELEMENT
Filed Jan. 22, 1962    2 Sheets-Sheet 2

INVENTOR
Ludwig Axthammer
By Richard Ernst
Agt

United States Patent Office 3,094,317
Patented June 18, 1963

3,094,317
HYDRO-PNEUMATIC SPRING ELEMENT
Ludwig Axthammer, Schweinfurt (Main), Germany, assignor to Fichtel & Sachs A.G., Schweinfurt (Main), Germany, a corporation of Germany
Filed Jan. 22, 1962, Ser. No. 167,744
Claims priority, application Germany Jan. 21, 1961
13 Claims. (Cl. 267—64)

This invention relates to suspensions for automotive vehicles and the like, and more particularly to a hydro-pneumatic spring element adapted to be interposed between the sprung masses and unsprung masses of a vehicle.

Such spring elements, also commonly referred to as air-oil suspensions, are known. They may combine the functions of conventional springs with those of shock absorbers, but they may also cooperate with separate shock absorbers.

Hydro-pneumatic spring elements of the type referred to generally consist of a piston which sealingly engages a cylinder. The piston and cylinder are respectively fastened to the sprung and unsprung masses, such as the wheels and the frame of a vehicle. The cylinder is filled with a liquid and communicates with a storage space in which resilient means, such as a gas cushion, is provided to hold the liquid under positive pressure, that is, a pressure greater than ambient atmospheric pressure.

Because of the compressibility of the gas cushion, hydro-pneumatic spring elements may readily be given the soft spring characteristics generally preferred in automotive passenger vehicles, but these characteristics are normally available only at the cost of a relatively long piston stroke if the weight to be transmitted by the spring element is subject to major variations. The resulting variations in ground clearance of the vehicle frame are undesirable, and a pump and valves are usually supplied to vary the amount of liquid in the cylinder in a suitable manner to compensate for ground clearance changes. In hydro-pneumatic spring elements of advanced design, the pump is energized by the relative reciprocating movement of the piston and cylinder.

While the known hydro-pneumatic spring elements have satisfactory performance characteristics, they are relatively complex mechanisms with the inherent disadvantages of high cost, sensitivity to rough operating conditions, and relatively difficult maintenance and repair.

The object of this invention is the provision of a hydro-pneumatic spring element of the afore-described advanced type which combines the favorable performance characteristics of the best known spring elements with great structural simplicity, and therefore is relatively inexpensive to build and to maintain, and is sturdy and durable even in rough use.

With these and other objects in view, the invention in its more specific aspects provides a spring element including a main cylinder and an auxiliary cylinder fixedly and coaxially connected by a conduit. An axially elongated piston member is arranged in the cylinders and the conduit in such a manner that a free end portion of the piston member forms a plunger in the main cylinder, whereas the remainder of the piston member passes through the conduit and the auxiliary cylinder. The piston member seals the connecting conduit, and it can move from a normal position inwardly or outwardly of the main cylinder. When the piston member is in its normal position, the auxiliary cylinder communicates with a liquid storage chamber, but is sealed from that chamber by an auxiliary piston on the piston member which engages the auxiliary cylinder and moves inward therein to compress a liquid in the auxiliary cylinder when the piston member moves from the normal position inwardly of the main cylinder. An expansion chamber communicates with the main cylinder and includes resilient means for keeping liquid therein under positive pressure. This liquid is part of a liquid body which fills the cylinders and at least partly fills the afore-mentioned storage chamber. The spring element has three normally closed valves. A first one of these valves connects the auxiliary cylinder to the main cylinder when the auxiliary piston compresses the liquid in the auxiliary cylinder. A second valve connects the main cylinder with the storage chamber when the piston member moves from its normal position outwardly of the main cylinder. The third valve connects the auxiliary cylinder to the storage chamber when the piston member moves outwardly of the main cylinder toward its normal position, whereby the auxiliary piston is moved in the auxiliary cylinder in an outward direction.

Other features and many of the attendant advantages of this invention will be readily appreciated as the same becomes better understood by reference to the following detailed description when considered in connection with the accompanying drawings in which like reference numerals designate like parts throughout the figures thereof, and wherein:

FIG. 1 is an axially sectional view of a preferred embodiment of the spring element of the invention;

FIG. 2 shows a modified spring element of the invention in a view corresponding to that of FIG. 1;

Figure 3:
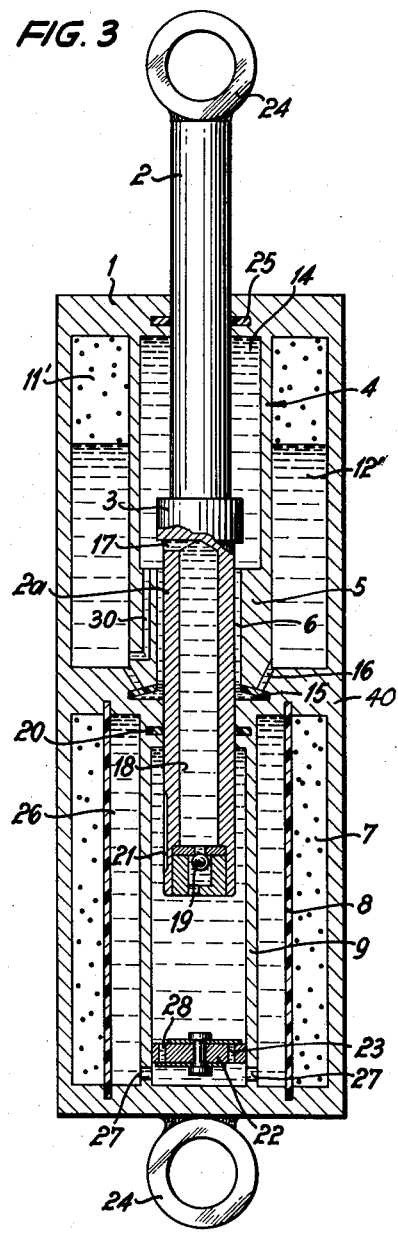
FIG. 3 illustrates yet another modified version of the spring element of FIG. 1 in axial section.

Referring now to the drawing in detail, and initially to FIG. 1, there is seen a spring element having the approximate outward appearance of a conventional direct-acting automotive shock absorber. The spring element has a cylinder member 1 in which a piston member 2 is axially reciprocable. A packing ring 25 engages the members 1 and 2 to prevent escape of fluid from the cylinder member 1. The outwardly projecting end of the piston member 2 and the opposite end of the cylinder member carry respective annular attachment members 24 as is conventional in automotive shock absorbers.

A transverse wall 40 bi-sects the cavity within the cylinder member 1 into two axially adjacent portions. For more convenient description, it will be assumed that the axis of the spring element is vertical, and that the piston member 2 projects from the top of the cylinder member 1, but it will be obvious to those skilled in the art that the spring elements of the invention are not limited to use in such a position, and may be modified without the exercise of invention to operate, for instance, in an inversed position.

The two axially superposed portions of the cylinder cavity are further divided by a coaxial tubular partition 4. The piston member 2 reciprocates within the axial space defined within the partition 4 and is normally spaced from the partition by an annular space. The lower portion 2a of the piston is tubular and constitutes a plunger which cooperates with a main cylinder space 9 defined within the axial bore of the tubular partition 4 by the transverse wall 40. A central axial bore in the wall 40 constitutes a conduit which is normally sealed by the plunger 2a. A packing ring 20 in the conduit prevents axial leakage of liquid along the plunger 2a.

Immediately above the plunger portion 2a, the piston member 2 carries a collar 3. A portion 5 of the partition 4 extending axially upward from the transverse wall 40 is thicker than the remainder of the partition 4 above the wall 40 and defines a relatively narrow annular cylinder space 6 between the partition 4 and the plunger 2a. The diameter of the collar 3 is equal to that of the cylinder space 6. In FIG. 1, the piston member 2 is assumed to be in its normal position when the spring element operates under relatively uniform conditions of loading as will be discussed in more detail hereinafter. When the piston member 2 moves downward from this normal position, and the plunger 2a moves inward of the main cylinder space 9, the collar 3 sealingly engages the portion 5 of the partition 4. This portion and the collar 3 thus act as the cylinder and piston respectively of an auxiliary pump the functions of which will become presently apparent.

When the piston member 2 is in the normal position shown in FIG. 1, the collar 3 does not materially interfere with the axial passage of liquid between the cylinder space 6 of the auxiliary pump and an adjacent portion 14 of the annular space between the piston member 2 and the tubular partition 4. Apertures 13 in the topmost portion of the partition 4 of which only two are visible in FIG. 1, connect the space portion 14 with a space which extends between the partition 4 and the outer wall of the cylinder member 1 above the transverse wall 40. The space is divided by a tubular resilient membrane 10 into an outer compartment 11 normally filled with a gas at relatively low pressure, and an inner compartment 12 which in the operative condition of the spring element is filled with liquid, such as conventional hydraulic shock absorber fluid. The space portion 14 and the compartment 12 jointly constitute a liquid storage chamber which normally communicates with the cylinder space 6 of the auxiliary pump.

The annular space between the partition 4 and the outer wall of the cylinder member 1 below the transverse wall 40 constitutes an expansion chamber which is divided by a tubular resilient membrane 8 into an outer compartment 7 normally filled with gas at higher pressure than prevails in the compartment 11, and an inner, normally liquid-filled compartment 26. The gas cushion in the compartment 7 urges the membrane 8 against the liquid in the compartment 26 to maintain that liquid at a positive pressure. The several gas and liquid compartments may be equipped with valves communicating with the outside for introducing the respective operating fluids, or for releasing them as is conventional.

Several radial apertures 27 of which two are seen in FIG. 1 are provided at the bottom end of the partition 4 to provide communication between the main cylinder space 9 and the compartment 26 of the expansion chamber. Immediately above the apertures 27, a plug 22 is inserted in the lower terminal portion of the main cylinder space. It has two check valves 23, 28 of very small flow section which respond to pressure differentials on the two sides of the plug to open narrow throttling passages in the plug 22. The check valve 23 opens when the pressure is higher below the plug 22 than above it, and the valve 28 opens under the opposite conditions.

The plunger portion 2a of the piston member is hollow. Its axial cavity 18 is closed at the free end of the plunger by a check valve 19 which opens when the pressure within the cavity 18 is higher than that in the main cylinder space 9. A radial opening 17 under the collar 3 connects the cavity 18 with the cylinder space 6 of the auxiliary pump in all operative positions of the piston member 2. The check valve 19 thus opens when inward movement of the piston member 2 in the cylinder member 1 causes the collar 3 to compress a liquid in the auxiliary pump. Hydraulic fluid normally fills the two cylinder spaces 6 and 9, the liquid storage chamber 12, 14, the compartment 26 of the expansion chamber, and the ducts and valves connecting the cylinder spaces and chambers.

Another check valve is constituted by a resilient ring 15 mounted in a recess of the wall 40 which permanently communicates with the auxiliary pump cylinder 6. The ring has two parallel conical faces of which one normally seals the orifices of several ducts 16 which lead from the portion 12 of the liquid storage chamber to the afore- mentioned recess in the wall 40. When the liquid pressure in the auxiliary pump cylinder 6 is sufficiently reduced by outward movement of the collar 3 while the collar is in sealing engagement with the portion 5 of the partition 4 to overcome the resilient force of the ring 15, the check valve opens to admit liquid from the storage chamber to the auxiliary pump.

The lower terminal portion of the plunger 2a has several axial grooves 21 formed in the cylindrical plunger surface. The grooves, of which only one is visible in FIG. 1, are on the same axial level. Their axial length is such that the spacing between their radially open end portions is greater than the axial thickness of the wall 40 between the main cylinder space 9 and the aforementioned recess which communicates with the cylinder space 6 of the auxiliary pump. When the piston member 2 moves outward of the cylinder member 1 from the normal position illustrated, a position is reached in which the radially open end portions of the grooves 21 connect the auxiliary pump with the main cylinder space 9. The walls of the grooves 21 together with corresponding portions of the wall 40 thus in effect constitute a slide valve which responds to outward movement of the plunger 2a from the normal position to connect the main cylinder space 9 to the auxiliary pump. Such outward movement also removes the collar or auxiliary piston 3 from the pump cylinder space 6 so that an open communication is established between the main cylinder space 9 and the liquid storage chamber 12, 14.

The afore-described apparatus operates as follows:

When the piston member 2 is in the normal position illustrated, the collar or auxiliary piston 3 is in the annular space portion 14 outside the auxiliary cylinder space 6, and the slide valve constituted by the grooves 21 and associated structure is closed. The element provides a normal spring action. The inward and outward movements of the piston member 2 cause compression and expansion of the gas cushion in the compartment 7 of the expansion chamber by liquid displaced from and drawn into the main cylinder space 9 by the plunger 2a. The liquid movement is throttled by the narrow passages in the plug 22 in a manner well known in itself.

When a heavier load causes the piston member 2 to move inwardly of the cylinder member 1 beyond its normal position, the collar 3 engages the portion 5 of the tubular partition 4, and the auxiliary pump feeds liquid under pressure from the space 6 through the opening 17, the plunger cavity 18, and the check valve 19 into the main cylinder space 9 during the inward stroke of the piston member 2, and draws additional liquid from the storage chamber 12, 14 through the duct 16 and check valve 15 during the outward stroke of the piston member 2. The auxiliary pump is thus energized by the normal reciprocating expansion and contraction of the spring element to pump liquid from the storage chamber into the main cylinder until the gas cushion in compartment 7 of the expansion chamber is compressed to balance the heavier load, and to restore the desired ground clearance by maintaining a position of the piston member 2 which is closely adjacent its normal position. The pump is effective until the collar 3 is moved outward of the cylinder space 6.

If the load on the spring element is reduced below that load which maintains the piston member 2 in its normal position, the gas pressure in the compartment 7 forces the plunger outward of the main cylinder space 9 until the grooves 21 bridge the wall 40 and permit liquid to flow from the main cylinder space 9 through the auxiliary cylinder space 6 to the liquid storage compartment. When a sufficient amount of liquid has been bled from the main cylinder space 9, the piston member 2 reverts to its normal position.

The piston member 2 and cylinder member 1 reciprocate axially relative to each other during normal vehicle movement. The term "normal position" will thus be understood to designate a range of reciprocating movement and not a fixed relative position of the piston and cylinder members. This range of movement is characterized by the lack of engagement between the piston and cylinder of the auxiliary pump and by the closed condition of the slide valve provided by the grooves 21.

The spring element illustrated in FIG. 2 is closely similar to that shown in FIG. 1. Its structure and assembly are somewhat simplified by the provision of a unitary tubular membrane member 29 which replaces the membranes 8 and 10 of the device shown in FIG. 1. The transverse wall 40' of the spring element consists of several annular portions between which the membrane member is clamped. These annular portions are fastened respectively to the outer wall of the cylinder 1 and to the tubular partition 4.

In the embodiment of the invention shown in FIG. 3, the tubular membrane 10 of the element illustrated in FIG. 1 has been dispensed with, and separation of a compressible gas from the liquid in the storage chamber is achieved by gravity only. The radial apertures 13 are replaced by a permanently open duct which has orifices in the annular space portion 14 between the partition 4 and the piston member 2, and at the bottom of the space defined between the partition 4 and the outer wall of the cylinder member 1 above the transverse wall 40. The lower portion 12' of this space is filled with hydraulic fluid when the apparatus operates, and the upper space 11' with a gas preferably insoluble in the fluid, such as air or nitrogen.

The structural modifications described above do not materially affect the operation of the spring elements shown in FIGS. 2 and 3. They function in the same manner as described above in connection with the embodiment of the invention illustrated in FIG. 1.

Figure 4:
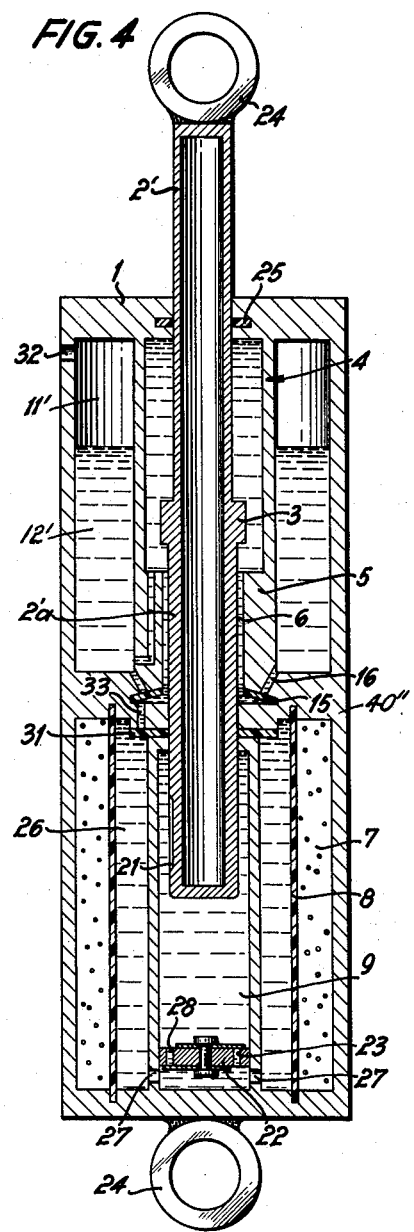
FIG. 4 shows a spring element of the invention which is of particularly simple structure, the view being in axial section.

The spring element seen in FIG. 4 is similar to that shown in FIG. 3 in relying on gravity for separation of a gas from the hydraulic fluid in the liquid storage chamber. The upper portion 11' of this chamber is permanently vented by an opening 32 in the outer wall of the cylinder member 1 so that the liquid in the storage chamber is substantially under ambient atmospheric pressure.

The piston member 2' seen in FIG. 4 is imperforate. It is hollow to reduce its weight, but its internal cavity is sealed. To provide a passage for liquid under pressure from the auxiliary pump to the main cylinder space 9, the transverse wall 40" is modified to have a radial lower face in the liquid compartment 26 of the expansion chamber. The face is covered by a resilient flat ring 31 which extends toward the axis of the spring element to form a packing about the plunger 2'a, and to prevent leakage between the compartment 26 and the pump cylinder space 6.

Several ducts 33 of which only one is visible in FIG. 4 are formed in the transverse wall 40". They are circumferentially spaced about the axis of the apparatus. Each duct has an orifice in the aforementioned recess in the transverse wall which communicates with the pump cylinder space 6, and another orifice in the radial lower face of the wall 40" in the liquid compartment 26. The ducts 33 thus are normally blocked under the resilient force of the ring 31, and are opened when a higher pressure in the auxiliary pump overcomes the resistance of the ring 31. Liquid is then pumped from the liquid storage chamber into the expansion chamber and thence into the main cylinder space 9 under the same conditions of operation which cause the check valve 19 to open in the structure illustrated in FIG. 1.

The number of structural parts in the embodiments of the invention illustrated in FIG. 4 is even smaller than in the devices seen in FIGS. 1 to 3, and FIG. 4 clearly demonstrates the structural simplicity achieved in the spring elements of the invention.

It should be understood, of course, that the foregoing disclosure relates to only preferred embodiments of the invention, and that it is intended to cover all changes and modifications of the examples of the invention chosen for the purpose of the disclosure which do not constitute departures from the spirit and scope of the invention set forth in the appended claims.

I claim:
1. In a hydro-pneumatic spring element adapted for connecting sprung and unsprung masses, in combination,
   (a) a main cylinder means defining a main cylinder space;
   (b) resilient means for maintaining a liquid in said main cylinder space under positive pressure;
   (c) a plunger member sealingly engaging said main cylinder means for substantially closing said space, said plunger member being movable from a normal position relative to said cylinder means inwardly and outwardly of said cylinder space;
   (d) auxiliary cylinder means defining an auxiliary cylinder space;
   (e) liquid storage means defining a liquid storage space normally communicating with said auxiliary cylinder space for passage of a liquid between said auxiliary cylinder space and said storage space;
   (f) auxiliary piston means adapted to seal said auxiliary cylinder space from said storage space when engaging said auxiliary cylinder means, said piston means being connected to said plunger member for engagement with said auxiliary cylinder means and movement inward of said auxiliary cylinder space for exerting pressure on a liquid therein when said plunger member moves from said normal position thereof inwardly of said main cylinder space, and for movement outward of said auxiliary cylinder space when said plunger member moves outwardly of said main cylinder space toward said normal position thereof, said plunger member and auxiliary piston means constituting a unitary piston member;
   (g) first valve means responsive to the pressure exerted on a liquid in said auxiliary cylinder space by said auxiliary piston means for connecting said auxiliary cylinder space to said main cylinder space;
   (h) second valve means responsive to movement of said plunger member outward of said main cylinder space from said normal position thereof for connecting said main cylinder space with said storage space;
   (i) third valve means responsive to said outward movement of said auxiliary piston means for connecting said auxiliary cylinder space to said liquid storage space; and
   (j) fastening means for respectively fastening said main cylinder means and said plunger member to said sprung and unsprung masses.

2. In a spring element as set forth in claim 1, a conduit of predetermined length connecting said main cylinder space and said auxiliary cylinder space, said plunger member being elongated and longitudinally movable in said conduit, said plunger member sealing said conduit when in said normal position; and a duct on said plunger member having two outwardly open portions longitudinally spaced a distance greater than said length of said conduit and connecting said cylinder spaces when said plunger member moves outward of said main cylinder space from said normal position thereof, said duct and said conduit constituting said second valve means.

3. In a spring element as set forth in claim 1, said cylinder spaces having a common axis, and said main and auxiliary cylinder means including a common tubular member radially defining said cylinder spaces.

4. In a spring element as set forth in claim 1, said resilient means including means defining an expansion space, and a resilient member separating said expansion space into two compartments, one of said compartments communicating with said main cylinder space.

5. In a spring element as set forth in claim 1, a gaseous medium occupying a portion of said liquid storage space, a liquid occupying the remainder of said liquid storage space and substantially filling said cylinder spaces, and a resilient member separating said portion of said storage space from said remainder.

6. In a spring element as set forth in claim 5, said resilient means including means defining an expansion space, said resilient member separating said expansion space into two compartments, one of said compartments communicating with said main cylinder space.

7. In a spring element as set forth in claim 1, said auxiliary piston means and said plunger member constituting a unitary piston member formed with a passage having respective orifices communicating with said auxiliary cylinder space and said main cylinder space when said plunger member moves inward of said main cylinder space from said normal position thereof, said first valve means being mounted in said passage.

8. A spring element adapted to be interposed between the sprung and unsprung masses of an automotive vehicle and the like, comprising in combination,
   (a) a main cylinder;
   (b) an auxiliary cylinder;
   (c) a conduit fixedly connecting said cylinders, said conduit and said cylinders having a common axis;
   (d) an axially elongated piston member having a free end portion in said main cylinder and being movable in said cylinders and in said conduit from a normal position inwardly and outwardly of said main cylinder, said piston member when in said normal position sealing said conduit;
   (e) a liquid storage chamber communicating with said auxiliary cylinder for passage of a liquid when said piston member is in said normal position thereof;
   (f) an auxiliary piston on said piston member, said auxiliary piston engaging said auxiliary cylinder and moving inwardly thereof for sealing the same from said liquid storage chamber and exerting pressure on a liquid in said auxiliary cylinder when said piston member moves from said normal position thereof inwardly of said main cylinder;
   (g) an expansion chamber communicating with said main cylinder;
   (h) resilient means in said expansion chamber for keeping a liquid therein under positive pressure;
   (i) a liquid substantially filling said cylinders and occupying respective portions of said chambers;
   (j) first valve means responsive to the pressure exerted on said liquid in said auxiliary cylinder by said auxiliary piston for connecting said auxiliary cylinder to said main cylinder;
   (k) second valve means responsive to the movement of said plunger member outward of said main cylinder from said normal position thereof for connecting said main cylinder to said storage chamber;
   (l) third valve means responsive to movement of said auxiliary piston outward of said auxiliary cylinder when said piston member moves outwardly of said main cylinder toward said normal position thereof for connecting said auxiliary cylinder to said storage chamber; and
   (m) fastening means for fastening said cylinders and said pistons to said sprung and unsprung masses, respectively.

9. A spring element as set forth in claim 8, wherein said first valve means includes a duct communicating with said main cylinder and said auxiliary cylinder, and an annular flat valve member of resilient material, a first portion of said valve member normally closing said duct under the resilient force thereof, and a second portion of said valve member sealingly engaging said piston member intermediate said cylinders.

10. A spring element as set forth in claim 8, wherein said third valve means include a duct communicating with said auxiliary cylinder and said storage chamber, and an annular valve member of resilient material normally closing said duct under the resilient force thereof.

11. A spring element as set forth in claim 10, wherein said annular valve member has a conical annular face about said common axis, said face engaging said duct.

12. A spring element as set forth in claim 8, wherein a duct is interposed between said main cylinder and said expansion chamber, the flow section of said duct being substantially smaller than the respective flow sections of said main cylinder and of said expansion chamber, for throttling the flow of liquid between said main cylinder and said expansion chamber.

13. A spring element as set forth in claim 12, wherein said duct includes a plug member inserted into a terminal portion of said main cylinder remote from said free end of said piston member, said plug member being formed with a throttling passage therethrough.

References Cited in the file of this patent

UNITED STATES PATENTS 2,436,573      Heynes _____ Feb. 24, 1948